(No Model.)
J. F. WOODYARD.
DEVICE FOR HEATING, AERATING, AND COOLING MILK.
No. 543,713. Patented July 30, 1895.
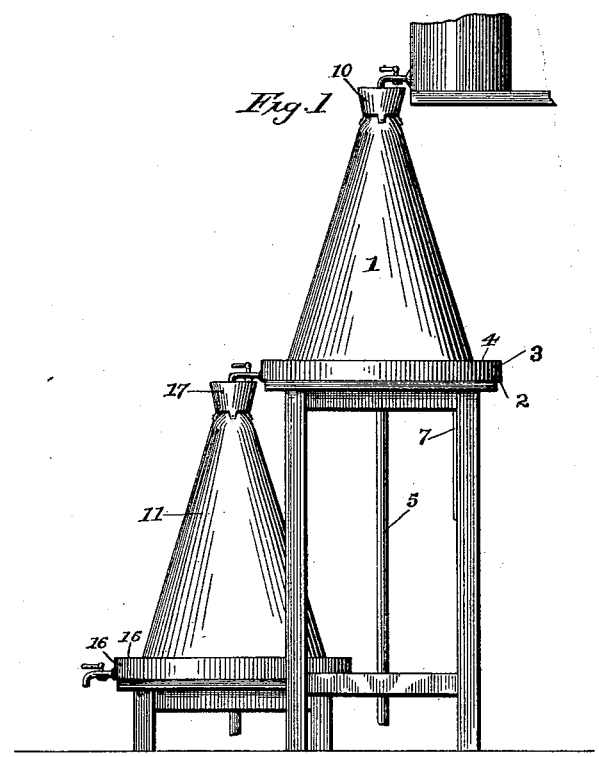
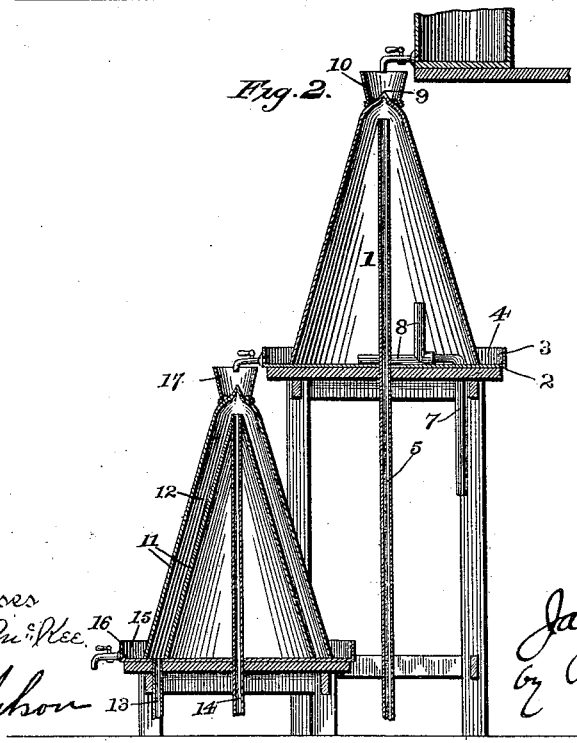
Witnesses
Edwin G. McKee.
W. P. Wilson
Inventor
Jacob F. Woodyard
by Philip W. Avirett,
his Attorney.

United States Patent Office.

JACOB FAUNTLEY WOODYARD, OF PARKERSBURG, WEST VIRGINIA.

DEVICE FOR HEATING, AERATING, AND COOLING MILK.

SPECIFICATION forming part of Letters Patent No. 543,713, dated July 30, 1895.

Application filed April 12, 1895. Serial No. 545,450. (No model.)

*To all whom it may concern:*

Be it known that I, JACOB FAUNTLEY WOODYARD, a citizen of the United States, residing at Parkersburg, in the county of Wood and State of West Virginia, have invented certain new and useful Improvements in a Combined Pasteurizer and Aerator for Milk; and I do hereby declare the following to be a full, clear, and exact description of the invention, such as will enable others skilled in the art to which it appertains to make and use the same.

My invention relates to improvements in devices for pasteurizing and aerating and cooling milk, the object of the same being to provide an apparatus for the treatment of milk which will kill all of the bacteria therein and prevent cooking of the same by an even and regular distribution of heat, and afterward cooling and aerating the same for deposit in suitable jars or cans.

The invention consists of a closed tank, substantially conical in form, made of tin or other suitable metal, resting upon its broad surface and having an annular receptacle around its lower edge, a steam-inlet pipe entering near the bottom thereof, and a discharge-pipe leading from the upper part thereof and extending downwardly through the center. A suitable funnel is provided at the upper end of this tank for feeding the milk in thin sheets along the outer surface thereof. The receptacle around the lower edge of this tank leads into a funnel for discharging the heated milk into the cooler or aerator. This cooler or aerator consists of two parallel concentric cone-shaped receptacles, with a cold-water pipe leading to the space between said receptacles and a discharge-pipe leading from the upper end of said space downward through the center thereof.

The invention also consists in other details of construction and combinations of parts, which will be more fully hereinafter described and claimed.

In the drawings, Figure 1 represents a side elevation of my apparatus. Fig. 2 is a vertical central section through the same.

Like reference-numerals indicate like parts in the two views.

My pasteurizer consists of a tank 1, substantially conical in shape, and a flat base 2 secured thereto. This is preferably made of tin or other cheap sheet metal and is adapted to be filled with hot water. The base 2 is extended outwardly beyond the lower end of the tank 1 and has its sides turned up, forming an annular flange 3 and creating a receptacle 4 between said flange and the lower edge of the tank 1. A discharge pipe 5 leads from a point near the top of the tank 1 downwardly and centrally of said tank. The steam-inlet pipe 7 leads into the tank 1 near its lower end and has connected to it the right-angled pipe 8, one arm thereof leading upwardly and the other in a horizontal direction. By this construction the steam entering through the pipe 7 causes a circulation of the water contained in the tank 1 and prevents rumbling and jarring of the chamber. The upper end of the tank 1 is rounded and is then extended upward to a point, as shown at 9. Leading on to this point 9 is a funnel 10, into which the milk is discharged from any suitable source of supply. The milk, striking the point 9, falls downward in thin sheets around the outer surface of the tank 1, in close contact with the hot water contained therein, and, becoming thus quickly heated, all bacteria contained therein are killed, but at the same time the milk is not cooked and no disagreeable taste or smell is left in it or given to it.

The steam entering through the pipe 7 keeps up the heat of the water contained in the tank 1, and any condensed steam or excess of water is discharged through the exhaust-pipe 5.

My aerator is located just beneath the pasteurizer just described, and consists of two parallel concentric conical-shaped sheets of tin 11 11, an annular space 12 being left between the two conical-shaped sheets. A cold-water pipe 13 leads into the passage 12, and an exhaust-pipe 14 is connected to the upper end of said passage 12 and leads downwardly centrally of the concentric conical sheets 11. The base of this aerator is shaped similarly to the base of the pasteurizer described, and an annular receptacle 15 is formed between the flange 16 of said base and the outer conical sheet 11. Water admitted to the pipe 13 passes upwardly through the passage 12 and is discharged through the exhaust-pipe 14, thereby creating at all times a current of cold water in the pipe 12. A funnel 17 is located at the top of this aerator, and the milk in the receptacle 4 is permitted to drop upon the upper end of the sheet 11 and to fall downwardly upon the outer surface of the cooler. It passes downwardly into the receptacle 15 and from it may be led into suitable cans or bottles.

The invention is very simple in construction, can be cheaply made, and is effective for the purpose for which it is designed.

Having thus described the invention, what is claimed as new is—

1. In an apparatus for the purpose described, the combination with a tank conical in shape, adapted to be heated from the interior and formed with an annular receptacle at its lower end, a tank located beneath said heating tank consisting of a pair of concentric conical-shaped sheets of metal, closed at their lower ends, a cold water inlet at the lower end of the passage between said concentric sheets, and a discharge pipe leading from the upper end of said receptacle, substantially as and for the purpose described.

2. In an apparatus for the purpose described, the combination with a pasteurizer consisting of a tank conical in shape, closed at its lower end and adapted to hold water, a steam inlet pipe entering said tank near its lower end and a discharge pipe leading from the upper end of said tank, of an aerator or cooler consisting of a pair of concentric sheets of tin or other suitable material having a passage between them, a cold water inlet leading into said passage, and a discharge pipe for water leading from the upper end of said passage, substantially as and for the purpose described.

In testimony whereof I have signed this specification in the presence of two subscribing witnesses.

JACOB FAUNTLEY WOODYARD.

Witnesses:
R. L. WOODYARD,
K. SNODGRASS.